United States Patent Office

Re. 27,227
Reissued Nov. 9, 1971

27,227
PERMEABLE CEMENTING COMPOSITION AND METHOD

Bobby G. Harnsberger, Houston, Tex., assignor to Texaco Inc., New York, N.Y.

No Drawing. Original No. 3,428,121, dated Feb. 18, 1969, Ser. No. 597,521, Nov. 29, 1966. Application for reissue Feb. 25, 1970, Ser. No. 14,251
Int. Cl. C04b *7/02;* E21b *33/13, 43/02*
U.S. Cl. 166—276 18 Claims

Matter enclosed in heavy brackets [ ] appears in the original patent but forms no part of this reissue specification; matter printed in italics indicates the additions made by reissue.

ABSTRACT OF THE DISCLOSURE

The invention relates to a method of and composition for the treatment of an incompetent formation penetrated by a well bore to prevent the movement of sand particles from the formation to the well bore during recovery of the formation fluids by forming a [slurry] *treating composition* of sand, cement and water in a hydrocarbon carrier oil, injecting the [slurry] *treating composition* into the formation under pressure, permitting the cement to set and form a permeable barrier [film] between the formation and well bore and recovering fluids from the formation through the formed permeable cement barrier.

The present invention relates to the treatment of permeable underground formations. More particularly, the present invention relates to a method of treating permeable underground oil and/or gas containing formations to stabilize the sandy portion thereof and to a treating composition useful in the stabilization of incompetent sand containing underground formations.

The recovery of fluids such as gas and/or oil from underground formations has been found to be troublesome in areas wherein the underground formation is composed of one or more incompetent sand containing layers or zones. The sand particles in the incompetent zone and/or layer tend to move or migrate to the well bore during recovery of the formation fluids from the particular zone and/or layer and frequently the moving sand particles block the passageways leading to the well bore. Plugging or materially impairing the flow of the formation fluid toward the bore hole results in a loss of these fluids to the producer or so decreases the rate of oil recovery from the well as to cause the well to be shut down because it is economically unattractive to continue to produce therefrom. An additional adverse factor resulting from the movement of the sand particles toward the well bore is that they are often carried along with the formation fluids to the well bore and passed through the pipes, pumps, etc. being used to recover the formation fluids to the surface with resulting damage to the moving parts thereof as the [said] *sand* particles are very abrasive.

Many attempts have been made heretofore to prevent or decerase the flow of undesirable sand particles in the formation and/or in the production tubing and associated equipment, such as by the placement of sand screens, filters, liners, and so forth. These prior attempts have been unsuccessful for a number of reasons among which is that these mechanical devices fail to prevent completely the flow of the formation particles into the production equipment. In addition, these devices interfere with various types of completion and workover operations. In recent years the industry has attempted to avoid the difficulties encountered in the use of mechanical devices by employing various chemical compositions to effect consolidation of the underground incompetent formations. These methods have generally consisted of injecting into the underground formation polymerizable resinous materials which when subsequently polymerized consolidate the formation sand to form permeable barriers in the formation to prevent the sand particles from movement therethrough. However, this technique of sand consolidation has not met with widespread acceptance because of the inherent difficulties of effecting polymerization and even distribution of the resinous materials in the formation to a degree sufficient to consolidate these underground formations and yet permitting the unobstructed flow of the desirable formation fluids therethrough. Further, the cost associated with these resin coating methods has been relatively high in comparison with the prior mechanical methods.

By the method of the present invention one is able to treat effectively the underground formation to be stabilized in a rapid and efficient manner while avoiding the disadvantages of these prior art methods both mechanical and chemical.

One object of the present invention is to provide an improved method of treating underground sand containing formations to stabilize the incompetent formation. An additional object is to provide a fluid permeable barrier between the formation sand and the well bore to prevent or to minimize the flow of unconsolidated sand particles therethrough while maximizing the flow of desired fluids and particularly petroleum hydrocarbons therethrough. A still further object is to provide a novel treating composition for use in stabilizing incompetent sand formations and to a method of placing same to form a permeable cement filter against the incompetent formation.

How these and other objects of the invention are accomplished will become apparent with reference to the accompanying disclosure. In at least one embodiment of the method of this invention at least one of the foregoing objects will be obtained.

It has now been discovered that an improved method of treating an incompetent sand containing underground formation comprises introducing against said formation a particular treating composition consisting essentially of [a] sand, cement and water [slurry] *treating composition* dispersed or suspended in a hydrocarbon oil in an amount sufficient to stabilize the formation and to form a fluid permeable barrier between the formation and the well bore. The resultant formed permeable barrier serves to prevent or to materially reduce the flow of the unconsolidated sandy particles therethrough while permitting the flow of desirable formation fluids through the permeable barrier at a substantially unimpaired rate.

More specifically the present invention comprises a method of and composition for the treatment of an incompetent formation penetrated by a well bore to prevent the movement of sand particles from the formation to the well bore during recovery of the formation fluids by forming a [slurry] *treating composition* of sand, cement and water in a hydrocarbon carrier oil, injecting the [slurry] *treating composition* into the formation under pressure, permitting the cement to set and form a permeable barrier [film] between the formation and well bore and recovering fluids from the formation through the formed permeable cement barrier.

In carrying out the method of the present invention the sand-cement [slurry] *-water treating composition* suspended in the petroleum hydrocarbon fraction is pumped down the well bore under sufficient pressure to force the [slurry] *treating composition* of the sand, cement and water against the unconsolidated formation adjacent to or in reasonable proximity to the well bore.

When the [permeable cement slurry] *treating compo-* 'tion is in contact with the formation to be stabilized adja- ent to the well bore the [slurry] *treating composition* is ermitted to remain in contact with the unconsolidated ormation and the cement component of the [slurry] *eating composition* is permitted to set up and harden. [ardening of the cement can be accelerated or retarded rough the use of additives which are known in the art. he bore hole is closed in for an appropriate period of me to permit hardening, e.g. from 8 to 72 hours. There- fter the well can be equipped for production and the for- ation fluids can be recovered by passing through the sulting formed permeable cement barrier into the well ore and recovered therefrom without the formation fluids eing contaminated with the presence therein of unconsol- lated sand particles.

The method of the present invention is adaptable for se in any type of well completion but it is generally used a well wherein casing has been set and which is quipped with perforations in the casing at the desired in- rvals where the unconsolidated formation sands are cated. Packers can be initially set above and below the erforated intervals to prevent the [permeable cement urry] *treating composition* from passing into the non- olated portions of the well and also to permit build-up f sufficient pressure on the [slurry] *treating composition* force same through the perforations and against the ormation without plugging up the well bore. After the ement [slurry] *treating composition* has been forced rough the casing perforations and against the formation, e well is shut in to permit the cement to set and form permeable cement barrier for the unconsolidated sand the formation.

The [cement slurry] *treating* composition useful in the ethod of the present invention must meet certain specific quirements. The sand component in general should be osely sized in the broad range 10–80 mesh, i.e. 12–20, )–40, 40–60 mesh or intermediate meshes, to permit fective relatively high permeability cement barriers be- g formed. In addition, the ratio of the sand component the cement component prior to the sand cement lurry] *-water treating composition* being suspended in e hydrocarbon carrier oil should be from about 3 parts about 12 parts by weight of sand per part of cement. has been found that a frac sand, i.e. a sand customarily sed in formation fracturing operations, having a size of etween about 20 to 40 mesh is suitable for use in cement slurry] *treating composition* of the present in- ention. It is preferred to use a graded sand with the rger grains being not more than about twice the diam- er of the smaller grains, i.e. 12–20 mesh, 20–40 mesh, )–60 mesh, etc.

In general a 20–40 mesh sand is employed as the sand mponent because of its ready availability and its adapt- ility for use in stabilizing most formations. In addition e use of a 20–40 mesh sand appears to prevent prema- re bridging which is likely to be more prevalent with ner mesh sands.

Sand particles which are coarser than about 10 mesh nd finer than about 80 mesh are unsuitable for use in e composition of the present invention. The coarser par- cles are not satisfactory because the resultant set cement rrier has too great a permeability to prevent the flow very fine unconsolidated sand particles therethrough hen the well is placed on production. Very fine sand par- cles in the [slurry] *treating composition* of the present vention, that is those sand particles finer than about 80 esh, are unsuitable because the resultant set cement s too low a permeability to permit the flow of desired rmation fluids therethrough.

The cement component of the composition of the pres- t invention should be present in the dry mixture in a tio of about 1 part of cement to from 3 to about 12 rts by weight of sand on a weight basis. The cement mponent of the composition of the present invention may be any of the cements normally used in oil well cementing operations as well as Plaster of Paris cement, sodium silicate cement, a silico phosphate cement, an acid phosphate cement or a pozzolan cement, a Sorel cement or a litharge cement. It is preferred that the cement component be a light weight portland cement having a density of about 75 lbs. per cubic foot and a chemical analysis approximately as follows: silicon dioxide 38.3%, aluminum oxide 13.0%, ferric oxide 5.2%, calcium oxide 35.7%, magnesium oxide 1.6% and sulfur trioxide 2.4%, with a loss on ignition of approximately 3.3%. This particular light weight portland cement has been found to be most suitable in the composition of the present invention since permeable cements made from this cement are most stable to attack by formation brines containing sodium chloride or sodium sulfate. Other oil well cements are not as resistant to attack by formation brines or sulfate solutions and therefore are not as practical for use in the cement composition of the present invention. These other cements appear to lose some of their compressive strength and become eroded from contact with sodium chloride and sodium sulfate solutions. In contrast the cements of the composition of the present invention are very resistant to erosion by sodium chloride or sodium sulfate solutions and do not lose their compressive strength even after prolonged exposure thereto.

The water component of the [slurry] *treating composition* will vary with the type of cement and the sand mesh range. Satisfactory results are obtained with from about 0.7 to about 0.95 part of water per part by weight of cement, when 20–40 mesh sand is used. Excess water may result in the separation of cement laden droplets of water from the sand whereas insufficient water may result in the separation of cement solids from the sand. In either case the formation may be damaged.

It has been found that the use of water containing salts such as sodium and/or calcium chloride are effective in preventing dispersions of the oil with oils containing surface active agents as the carrier medium. Desirably the salt concentration should approach a saturated solution at ambient temperature as the oil neutralization number approaches 1.0. Less than saturated salt solutions are used as the oil neutralization number decreases toward 0.3.

The oil neutralization number represents the amount in milligrams of I N potassium hydroxide required to neutralize one gram of the oil. Oils having a neutralization number below about 0.1 have been found to be most satisfactory.

The carrier medium for the sand-cement-water [slurry] *treating composition* is a hydrocarbon oil. Suitable hydrocarbon oils include the kerosene and diesel oil fractions of a petroleum crude oil as well as crude oil. A diesel oil fraction is normally employed since such a fraction is relatively inexpensive and is usually readily available at or near the treatment site. The oil should be relatively free of surface active materials such as naphthenic acids which may displace water from the sand and cement components. It has been found that the presence of surface active agents such as the naphthenic acids can be tolerated in the oil without adverse effects provided the neutralization number of the oil is not above about 0.3 without using a salt to offset the effect of the surface active agents. Sufficient of the hydrocarbon oil carrier medium is employed to suspend the [slurry] *treating composition* therein. It has been found that most satisfactory compositions have a [slurry] *treating composition* density in the range of from 8 to 12 pounds per gallon and the amount of solids suspended or dispersed in the hydrocarbon oil can be in the range of from about 0.5 to 5 lbs. of the [slurry] *treating composition* (sand, cement and water) per gallon of the hydrocarbon oil carrier medium.

The use of more viscous oils than diesel oil or kerosene fractions or non-viscous crude oils as the carrier medium is to be avoided since the heavier fractions are more difficult to pump down the well bore.

The sand-cement-water [slurry] *treating composition* can be prepared in the customary manner such as by mixing the components at the surface in a suitable vessel or in a mixing truck. The order of addition of the components of the [slurry] *treating composition* is not critical.

The hydrocarbon carrier medium containing the suspended solids is pumped down the well bore and into the formation at rates which may vary with well conditions. Generally, a rate of from about 1 to 2 barrels of the suspended solids in the carrier medium per minute is suitable for perforated intervals of 4–10 feet with higher rates being used for longer intervals. Such rates have been found to give the satisfactory results and the resulting permeable cement barrier formed in the unconsolidated formation has a sufficiently high compressive strength and sufficient permeability to permit the flow of formation fluids therethrough while stabilizing or restraining [maintaining] the formation sands.

EXAMPLE 1

A well was prepared for a field trial by running tubing and a packer and by swabbing the well in. A considerable volume of sand was produced and then the tubing was pulled and the perforations at the 5,138 to 5,142 feet depths were washed in the usual manner by use of a perforated washing tool or by setting a packer at intervals in the perforations and circulating fluid around same. Formation sand was left in the rat hole so that there was about four feet of open hole below the perforations. A packer and 90 feet of tail pipe were set with the tail pipe about 150 feet above the perforations. Diesel oil was spotted across the perforations and squeezed out in the formation at a rate of about 2 barrels per minute and with a pressure of about 1,500 p.s.i. to establish an injection pressure. In all about 5 barrels of diesel oil was squeezed into the formation.

A treating mixture was prepared in the following manner. A [slurry] *treating composition* of sand, [oil,] cement and water was prepared by mixing 3,600 pounds of sand, 675 pounds of cement and 70 gallons of water to wet the cement component of the [slurry] *treating composition* and then adding to the resultant mixture 165 gallons of a hydrocarbon oil. A second treatment of diesel oil was forced into the formation at a rate of about 2 barrels per minute until several additional barrels of oil had been injected into the formation. Thereafter the [cement slurry] *treating composition* in oil was pumped into the diesel carrier oil in an amount to give a solids content of about 0.5 to 0.75 pound per gallon diesel carrier oil. The [cement slurry] *treating composition* in the diesel carrier oil was injected into the formation at a rate of about 2 barrels per minute and at a pressure which increased from about 1500 to about 2400 p.s.i. during injection. It was calculated that approximately 1400 to 1500 pounds of the [cement slurry] *treating composition* in oil were injected into the formation. The final injection pressure was 3000 p.s.i. and the injection rate was one barrel per minute.

The cement was allowed to set for a period of about twelve hours while maintaining a column of diesel oil on the injected cement. Thereafter salt water was injected into the tubing and about forty feet of sand and cement were washed out of the casing. The cement was then drilled out in the customary manner and the well equipped for production. There was recovered from the well between 60–90 barrels per day of sand-free oil. Over a 14-month period the well continued to produce sand-free oil.

EXAMPLE 2

In another field test a well which had been cased with a seven-inch diameter, twenty-six pound casing and which had been perforated at the 7,684 to 7,704 feet intervals were prepared for the test by setting a retrievable bridge plug about 100 feet below the lower perforation. The casing was filled with a gelled mud between the bridge plug and the perforations. The perforations were then washer by setting a Retrievable Test-Treat-Squeeze (RTTS) Packer at 1 foot increments throughout the perforated interval and circulating wash liquid through the perforations. The wash liquid consisted of salt water and then approximately 500 gallons of conventional mud acid. After the acid had been circulated and removed the RTTS tool was picked up about 180 feet above the upper perforation. Then 20 barrels of diesel oil were pumped into the tubing with a circulating pressure of about 1000 p.s.i. at a pump rate of about 2 barrels per minute. The RTTS tool was then set and a diesel oil suspension of the [cement slurry] *treating composition* used in Ex. 1 was injected into the formation at a rate of about 2 barrels per minute. The initial injection pressure was about 3300 p.s.i. and the initial solids content of the diesel oil suspension was about 2.7 lbs. of the [permeable cement slurry] *treating composition* per gallon of diesel oil carrier medium. The solids content of the diesel oil suspension carrier fluid was decreased to about one pound per gallon as the treatment progressed. After about 120 barrels of the suspension had been injected into the formation the pressure rose to about 4800 p.s.i. Approximately 3000 lbs. of the [permeable cement] *treating composition* solids had been squeezed into the formation during the period. From 400 to 600 pounds of the [permeable cement] *treating composition* were additionally injected into the formation at a pressure of about 3300 p.s.i. and at a rate of about 0.25 barrel of [slurry] *treating composition* suspension per minute. A total of about 3500 lbs. of the [permeable cement] *treating composition* were injected into the formation. An eight hour waiting-on cement period was observed and then the soft cement and sand remaining in the casing were washed out in the usual manner using a salt water wash liquid. Then the well was subsequently put on production. It produced 60–90 barrels of sand-free oil. After eleven months on production, the well still was producing sand-free oil.

EXAMPLE 3

Another field test was carried out on a new well which was in a field that had a history of sand production. The well was prepared for test by setting the RTTS tool above the perforations in the casing which were at the 3,790-3,793 feet intervals and permitting the well to produce until it had sanded up. The sand was reversed out of the tubing and casing to a depth of 3,769 feet. The perforations were then washed out by circulating a salt water wash liquid around the tool which had been set in the center of the perforated interval. The wash liquid was continued until the well was clean and the RTTS tool was picked up about 180 feet above the upper perforations. There was pumped 22 barrels of diesel oil into the tubing and the tool was set.

A [permeable cement slurry] *treating composition* having the composition of Example 1 was prepared. The [slurry] *treating composition* was mixed with diesel oil carrier fluid in an amount of 1 pound per gallon of oil.

The diesel oil suspension of the [cement slurry] *treating composition* was pumped into the formation at an injection pressure of about 1700 p.s.i. and a rate of about 1.3 barrels per minute and a solids content of about 1 pound of the [slurry] *treating composition* per gallon of the oil. After injection of about 6 barrels of the suspension (260 pounds of the [cement slurry] *treating composition*) into the perforations the pressure rose from 1700 to 2500 p.s.i. and then decreased to about 1900 p.s.i. and remained at about 1900 p.s.i. until about 88 barrels of the [slurry] *treating composition* suspension were injected into the tubing. It was determined that about 2400 pounds of the solids had been squeezed into the perforations and about 27 barrels of the suspension remained in the tubing and the casing. Pumping was then discontinued for three eriods of about 15 to 30 minutes each to allow some ettling of the suspension solids. The pressure decreased about 1600 p.s.i. during these periods. A final squeeze ressure of 2100 p.s.i. was attained. It was determined at a total of about 3500 pounds of [sand-cement slurry] *eating composition* was squeezed into the formation. After 8 hours waiting-on cement the soft cement and sand the casing were washed out and subsequently the well as equipped for production. It was found that the well owed on a No. 30 choke and a tubing pressure of 250 .s.i. and made 97 barrels of sand-free oil per day. After n months on production the well was essentially sand ee.

EXAMPLE 4

In another field trial a well which had been perforated the 5,116–5,120 feet intervals with four shots per foot the 4.5 inch–9.5 pound casing was prepared for the st. The test preparation consisting of running the RTTS ol with a one foot stringer to 5,090 feet. The tool was t and the well was produced until it sanded up. Sand the tubing was then reversed out and the tool used to g bottom at 5,219 feet. An attempt was made to wash the erforations by setting the RTTS tool in the perforated terval using a salt water wash liquid but the formation as taking too much water for effective washing. The ol was then pulled up about 10 feet above the upper erforation and 7.5 sacks of gravel were poured down the bing to bring the bottom to a level of about 5,121 feet. he RTTS tool was picked up 180 feet above the perfora- ons and 10 barrels of diesel oil were pumped into the bing. The RTTS tool was then set and 30 barrels of a esel oil suspension of the [permeable cement mixture] *eating composition* of Example 1 were pumped through e tubing. The pumping rate was about 1 barrel per inute and this suspension contained about 1.5 pounds r gallon of the sand-water-cement [mixture] *treating mposition*. Pumping was stopped when the pressure ached 300 p.s.i. In all about 13 cubic feet of the [perme- ble cement] *treating composition* were injected into the rmation.

After a twelve hour period of waiting-on cement, the TTS tool was used to tag sand at 5031 feet and to wash hard cement at 5055 feet. The RTTS tool was pulled d a rock bit used to drill to 5118 feet. The well was then uipped for production and the first production gauge as 43 barrels gross, 13 barrels net, gas lifting sand-free ids from 4600 feet. Production of sand-free oil con- ued for an additional 14-day period when direct observa- ons were discontinued. At the end of the test period the ell was producing 60 barrels gross, 59 barrels net of nd-free oil and has continued at this rate for an addi- onal thirteen month period.

EXAMPLE 5

In a laboratory test 200 grams of 20–40 mesh frac nd were admixed with 40 grams of Trinity Lite Wate ement. Water in an amount of 32 ml. was added to wet e solid mixture and then into the [resultant slurry] *eating composition* there was added kerosene in an nount of 1000 ml. The resultant suspension of solids in rosene was then pumped at a pressure of 20–50 p.s.i. to a sand packed pipe which measured 3 inches in diam- er and 6 inches in length which was about ½ full of nd of a type that is typically found in an underground rmation. The solids were deposited on the surface of e sand while the liquid portion thereof passed through e sand in the pipe. The cement hardened and the perme- ility of the hardened cement was determined. It was und to be about 10 darcies. The sand was about 70–300 esh size having a permeability of about 10 darcies. The spension pump rate was about 1 gallon per minute. In l about 200 grams of solids were passed into the pipe.

Obviously, many modifications and variations of the vention as hereinbefore set forth may be made without parting from the spirit and scope thereof, and therefore only such limitations should be made as are indicated in the appended claims.

I claim:

1. A method of treating an incompetent formation penetrated by a well bore to prevent the movement of unconsolidated sand particles from said incompetent formation to the well bore as formation fluids are recovered from said formation which comprises forming a [slurry] *treating composition* consisting essentially of sand having a particle size between 10 and 80 mesh, cement and sufficient water to wet the sand and cement particles, suspending the [sand and cement wetted particles] *resultant treating composition* in a hydrocarbon carrier oil fraction, injecting said [suspension] *suspended treating composition* against the unconsolidated formation at a pressure sufficient to permit the carrier medium to be forced into the unconsolidated formation, permitting the cement to set to form a permeable cement barrier [film] between the formation and the well bore and thereafter recovering fluids from the unconsolidated formation by passage through the formed permeable cement barrier.

2. A method as claimed in claim 1, wherein the [slurry] *treating composition* consists essentially of *cement*, from 3 to 12 parts by weight of sand particles having a mesh size of from about 10 mesh to about 80 mesh per part by weight of cement and wherein the size of the largest grains is not more than about twice the diameter of the smallest grains and wherein the amount of water present in said [slurry] *treating composition* is from about 0.7 to about 0.95 part by weight per part by weight of cement.

3. A method as claimed in claim 1 wherein the [slurry] *treating composition* is suspended in the hydrocarbon oil in an amount of from about 0.5 to 5 pounds of the [slurry] *treating composition* per gallon of the hydrocarbon oil.

4. A method as claimed in claim 1 wherein the hydrocarbon oil is a kerosene fraction.

5. A method as claimed in claim 1 wherein the hydrocarbon oil is a diesel oil fraction.

6. A method as claimed in claim 1 wherein the hydrocarbon oil is a light crude oil.

7. A method as claimed in claim 1 wherein prior to injecting the suspended [slurry] *treating composition* against the unconsolidated formation, the unconsolidated formation is washed with salt water to remove at least a portion of the unconsolidated sand particles adjacent to the well bore.

8. A [cement slurry] *treating composition* suspended in a hydrocarbon oil fraction for use in forming a permeable cement barrier in the bore hole adjacent to an unconsolidated sand-containing oil producing formation which consists essentially of *cement*, from about 3 to about 12 parts by weight of sand particles having an average mesh size of from about 10 mesh to about 80 mesh from about 0.7 to about 0.95 part by weight of water, each per part by weight of cement, and wherein said [suspension] *suspended treating composition* contains from about 0.5 to 5 pounds of said [slurry] *treating composition* per gallon of the hydrocarbon oil fraction.

9. A [cement slurry] *treating composition* as claimed in claim 8 wherein the water component contains a salt selected from the group consisting of a chloride of sodium, calcium and mixtures thereof in an amount approaching saturation at ambient temperature when the hydrocarbon oil fraction contains naphthenic acids in an amount sufficient to impart to said oil a neutralization number of from 0.4 to 1.0.

*10. A treating composition suspended in a hydrocarbon oil fraction for use in forming a permeable cement barrier adjacent to an unconsolidated sand-containing formation which consists essentially of cement, from about 3 to about 12 parts by weight of sand particles having an average mesh size of from about 10 mesh to about 80 mesh, and from about 0.7 to about 0.95 part by weight*

*of water, each per part by weight of cement, and wherein said suspended treating composition contains from about 0.5 to 5 pounds of said treating composition per gallon of said hydrocarbon oil fraction.*

*11. A treating composition as claimed in claim 10 wherein the water component contains a salt selected from the group consisting of a chloride of sodium, calcium and mixtures thereof in an amount approaching saturation at ambient temperature when the hydrocarbon oil fraction contains naphthenic acids in an amount sufficient to impart to said oil a neutralization number of from 0.4 to 1.0.*

*12. A method of treating an incompetent formation penetrated by a well bore to prevent the movement of unconsolidated sand particles from said incompetent formation to the well bore as formation fluids are recovered from said formation which comprises forming a hydrocarbon oil suspension of a treating composition consisting essentially of cement, sand having a particle size between 10 and 80 mesh, and sufficient water to wet the sand and cement particles, placing the hydrocarbon oil suspension of said treating composition against the unconsolidated formation, permitting the cement to set to form a permeable cement barrier between the formation and the well bore whereby formation fluids can be recovered by passage through the formed permeable cement barrier.*

*13. A method as claimed in claim 12 wherein the hydrocarbon oil suspension of the treating composition is placed against said formation by injecting said suspension at a pressure sufficient to permit the hydrocarbon oil carrier medium to be forced into the unconsolidated formation.*

*14. A method as claimed in claim 12 wherein the treating composition consists essentially of cement, from 3 to 12 parts by weight of sand particles having a mesh size of from about 10 mesh to about 80 mesh per part by weight of cement and wherein the size of the largest grains is not more than amout twice the diameter of the smallest grains*

*and wherein the amount of water present in said treating composition is from about 0.7 to about 0.95 part by weight per part by weight of cement.*

*15. A method as claimed in claim 14 wherein the hydrocarbon oil is a diesel oil fraction.*

*16. A method as claimed in claim 14 wherein the hydrocarbon oil is a light crude oil.*

*17. A method as claimed in claim 12 wherein the treating composition is suspended in the hydrocarbon oil in an amount of from about 0.5 to 5 pounds of the treating composition per gallon of the hydrocarbon oil.*

*18. A method as claimed in claim 12 wherein the hydrocarbon oil is a kerosene fraction.*

References Cited

The following references, cited by the Examiner, are of record in the patented file of this patent or the original patent.

UNITED STATES PATENTS

| | | | |
|---|---|---|---|
| 2,801,931 | 8/1957 | Morgan et al. | 166—293 X |
| 2,801,984 | 8/1957 | Morgan et al. | 166—295 X |
| 2,823,753 | 2/1958 | Henderson et al. | 166—295 |
| 2,878,875 | 3/1959 | Dunlap et al. | 166—293 |
| 2,900,027 | 8/1959 | Cooper | 166—288 |
| 3,071,481 | 1/1963 | Beach et al. | 166—293 X |
| 3,119,448 | 1/1964 | Rhoades | 166—293 |
| 3,145,774 | 8/1964 | Patchen | 166—293 |
| 3,146,829 | 9/1964 | Mann | 166—276 |
| 3,219,110 | 11/1965 | Martin et al. | 166—276 X |
| 3,291,214 | 12/1966 | Hower | 166—294 |

STEPHEN J. NOVOSAD, Primary Examiner

U.S. Cl. X.R.

106—90, 98; 166—293